US009118040B2

(12) United States Patent
Smith et al.

(10) Patent No.: US 9,118,040 B2
(45) Date of Patent: Aug. 25, 2015

(54) ELECTROCHEMICAL CELL WITH IMPROVED WATER OR GAS MANAGEMENT

(71) Applicant: Infinity Fuel Cell and Hydrogen, Inc., Windsor, CT (US)

(72) Inventors: William F. Smith, Suffield, CT (US); James F. McElroy, Suffield, CT (US); Jay W. LaGrange, New Hartford, CT (US)

(73) Assignee: Infinity Fuel Cell and Hydrogen, Inc., Windsor, CT (US)

(*) Notice: Subject to any disclaimer, the term of this patent is extended or adjusted under 35 U.S.C. 154(b) by 0 days.

(21) Appl. No.: 13/667,805

(22) Filed: Nov. 2, 2012

(65) Prior Publication Data

US 2013/0175164 A1    Jul. 11, 2013

Related U.S. Application Data

(60) Provisional application No. 61/583,782, filed on Jan. 6, 2012.

(51) Int. Cl.
| | |
|---|---|
| *H01M 8/04* | (2006.01) |
| *H01M 8/02* | (2006.01) |
| *C25B 15/08* | (2006.01) |
| *C25B 1/08* | (2006.01) |
| *C25B 9/00* | (2006.01) |

(52) U.S. Cl.
CPC .............. *H01M 8/0239* (2013.01); *C25B 1/08* (2013.01); *C25B 9/00* (2013.01); *C25B 15/08* (2013.01); *H01M 8/0256* (2013.01); *H01M 8/04291* (2013.01); *H01M 8/0273* (2013.01); *Y02E 60/366* (2013.01); *Y02E 60/50* (2013.01)

(58) Field of Classification Search
CPC . H01M 8/0273; H01M 8/0239; H01M 8/021; H01M 8/04291; H01M 8/04074
USPC .......................................................... 429/457
See application file for complete search history.

(56) References Cited

U.S. PATENT DOCUMENTS

| | | | | |
|---|---|---|---|---|
| 4,950,371 | A | * | 8/1990 | McElroy ...................... 205/628 |
| 5,116,696 | A | * | 5/1992 | Barp ............................ 429/434 |
| 5,942,347 | A | | 8/1999 | Koncar et al. |
| 5,989,318 | A | * | 11/1999 | Schroll .............................. 96/6 |
| 6,841,283 | B2 | | 1/2005 | Breault |
| 2003/0232234 | A1 | | 12/2003 | Cisar et al. |
| 2005/0058862 | A1* | | 3/2005 | Sone et al. ....................... 429/22 |
| 2006/0199061 | A1 | | 9/2006 | Fiebig et al. |
| 2007/0234900 | A1* | | 10/2007 | Soloveichik et al. ............. 95/46 |
| 2008/0160366 | A1 | | 7/2008 | Allen et al. |
| 2011/0024295 | A1* | | 2/2011 | Callahan et al. .............. 204/538 |

FOREIGN PATENT DOCUMENTS

| | | | |
|---|---|---|---|
| EP | 1484812 A2 | * | 12/2004 |
| WO | WO 99/67447 | * | 6/1998 |

* cited by examiner

*Primary Examiner* — Stewart Fraser
*Assistant Examiner* — Olatunji Godo
(74) *Attorney, Agent, or Firm* — Holland & Bonzagni, P.C.; Mary R. Bonzagni

(57) ABSTRACT

An electrochemical cell having a water/gas porous separator prepared from a polymeric material and one or more conductive cell components that pass through, or are located in close proximity to, the water/gas porous separator, is provided. The inventive cell provides a high level of in-cell electrical conductivity.

17 Claims, 5 Drawing Sheets

ELECTROCHEMICAL CELL WITH IMPROVED WATER OR GAS MANAGEMENT

RELATED APPLICATION

This application claims priority to U.S. Provisional Patent Application Ser. No. 61/583,782, filed on Jan. 6, 2012, the entirety of which is hereby incorporated by reference.

STATEMENT OF GOVERNMENTAL INTEREST

This invention was made with Government support under Contract No. NNC08CA87C awarded by the NASA/Glenn Research Center in Cleveland, Ohio. The Government has certain rights in the invention.

TECHNICAL FIELD

The present invention generally relates to an electrochemical cell with improved water or gas management, and in one exemplary embodiment relates to a fuel cell that utilizes high bubble point polymeric porous media.

BACKGROUND AND SUMMARY OF THE INVENTION

Electrochemical cell devices are typically made up of a plurality of electrochemical cells, arranged in groups or stacks, and commonly serve to: electrolytically disassociate water or another liquid (with or without dissolved constituents) into its components (i.e., electrolysis cells), or catalytically combine hydrogen or other fuel and an oxidizer (i.e., fuel cells), with electricity being either supplied or generated, respectively. Other related functions for electrochemical cell devices include their use as compressors, separation and/or purification means, sensors, and combinations of these functions.

Within arranged groups or stacks, each electrochemical cell includes a cathode, an electrolyte (e.g., a membrane), and an anode. In Proton Exchange Membrane or PEM cells, where the electrolyte is a cation exchange membrane, the cathode/membrane/anode assembly (i.e., "membrane electrode assembly" or "MEA") is typically supported on both sides by flow fields made up of screen packs or channeled plates. Flow fields, usually in the form of expanded metal or woven screens, or adhesive-bonded, laminated, or machined assemblies, facilitate fluid movement, removal of product water or product gas, and also serve to provide in, for example, PEM cells, mechanical support for the MEA.

Electrochemical cells, when operated as fuel cells or water electrolyzers, are desirable for various applications. Fuel cells, for example, have been proposed for many applications including as an energy source for supplying an aircraft with electric energy.

In specific regard to fuel cells with in-cell static water removal capabilities, such cells utilize conductive metal or metallic porous media that functions to remove fuel cell product water via a pressure differential. Unfortunately, this approach, which attempts to balance bubble point with acceptable water transport rates, is usually limited to low, approximately 0.01-0.06 Megapascals (MPa), bubble pressure.

Bubble point is used as a measure of the resistance of the flow of gas phase fluids through pores of filter or filter-like materials. The bubble point value is determined by observing when bubbles first begin to emerge on the permeate side or downstream side of a fully-wetted membrane filter or filter-like material when pressurized with a gas on the feed (upstream) side of the material.

High bubble point materials with excellent water transport exist and are commercially available but when compared to metal or metallic porous media are typically less electrically conductive or non-conductive.

In view of the above, what is needed is a fuel cell that utilizes high bubble point polymeric porous media with excellent water transport capability that has the ability to conduct electrical current.

Generally speaking, the present invention fulfills this need by providing an electrochemical cell that comprises a water/gas porous separator prepared from a polymeric material, and one or more conductive cell components that pass through, or are located in close proximity to, the water/gas porous separator, the electrochemical cell providing a high level of in-cell electrical conductivity.

In an exemplary embodiment, the inventive electrochemical cell operates as an in-cell static water removal fuel cell, wherein the water/gas porous separator is prepared from a high bubble point polymeric material.

The water/gas porous separator employed in this exemplary embodiment has a bubble point of greater than 0.06 MPa, preferably, from about 0.07 to about 0.55 MPa, which provides excellent water removal.

The inventive fuel cell demonstrates an area specific resistance (ASTM # B193-02 (2008) Standard Test Method for Resistivity of Electrical Conductor Materials) of less than or equal to about 100 mohms-cm$^2$, preferably less than about 20 mohm-cm$^2$.

Other features and advantages of the invention will be apparent to one of ordinary skill from the following detailed description and accompanying drawings. Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The present disclosure may be better understood with reference to the following drawings. Components in the drawings are not necessarily to scale, emphasis instead being placed upon clearly illustrating the principles of the present disclosure. While exemplary embodiments are disclosed in connection with the drawings, there is no intent to limit the present disclosure to the embodiment or embodiments disclosed herein. On the contrary, the intent is to cover all alternatives, modifications and equivalents.

Particular features of the disclosed invention are illustrated by reference to the accompanying drawings in which.

DETAILED DESCRIPTION OF THE INVENTION

As noted above, the electrochemical cell of the present invention comprises a water/gas porous separator. In the case of a fuel cell, the water/gas porous separator is prepared from a high bubble point polymeric material, and the inventive fuel cell further comprises one or more conductive cell components that pass through, or are located in close proximity to, the water/gas porous separator. The inventive fuel cell provides a high level of in-cell electrical conductivity.

The inventive fuel cell may be manufactured using carbon, composite, or metal based materials, with assembled stacks using either bipolar current or edge current collection design.

The water/gas porous separator used with the inventive fuel cell offers excellent water transport while preventing gas cross-over from the oxygen chamber to the water chamber. In an exemplary embodiment, the porous separator allows water to pass at low pressures ranging from at least about 0.001 MPa, while providing a gas bubble point of greater than 0.06 MPa, preferably, from about 0.07 to about 0.55 MPa.

Contemplated water/gas porous separators include separators in the form of plate-like structures that have a diameter ranging from about 2.54 to about 76.2 centimeters (cm) (preferably, from about 7.62 to about 38.1 cm), and a thickness ranging from about 0.05 to about 0.25 millimeters (mm) (preferably, from about 0.10 to about 0.20 mm).

The pore size or diameter of the pores of the water/gas porous separator ranges from about 0.03 to about 0.2 microns. The interior surface of the pores is wettable to water, which may be an inherent property of the material used to prepare the separator. Additionally, as noted above, the open pores of the separator are capable of providing a bubble pressure sufficient to prevent gas cross over from the oxygen chamber to the water chamber.

In an exemplary embodiment, the water/gas porous separator is prepared from a polyethersulfone (PES) membrane filter medium (0.1 micron pore size, rated flow=2.8 to 7.4 milliliters (ml)/min/cm$^2$ at 0.7 Bar), that is sold under the brand name "SUPOR" by the PALL Specialty Materials company, of Port Washington, New York, N.Y. 11050, U.S.A. PES is an inherently hydrophilic membrane that wets out quickly and completely resulting in superior flow rates and high throughputs.

In another exemplary embodiment, the water/gas porous separator is another PES membrane (0.03 micron pore size, rated flow=5.5 ml/min/cm$^2$ at 0.07 MPa), that is sold under the brand name "STERILITECH" by GE Osmonics, 5951 Clearwater Drive, Minnetonka, Minn. 55343.

In a first preferred embodiment, the porous separator contains a number of through-holes. The through-holes allow for physical contact between conductive mating structures (i.e., conductive tongue and groove structures) located on opposing sides of the porous separator.

Figure 1:
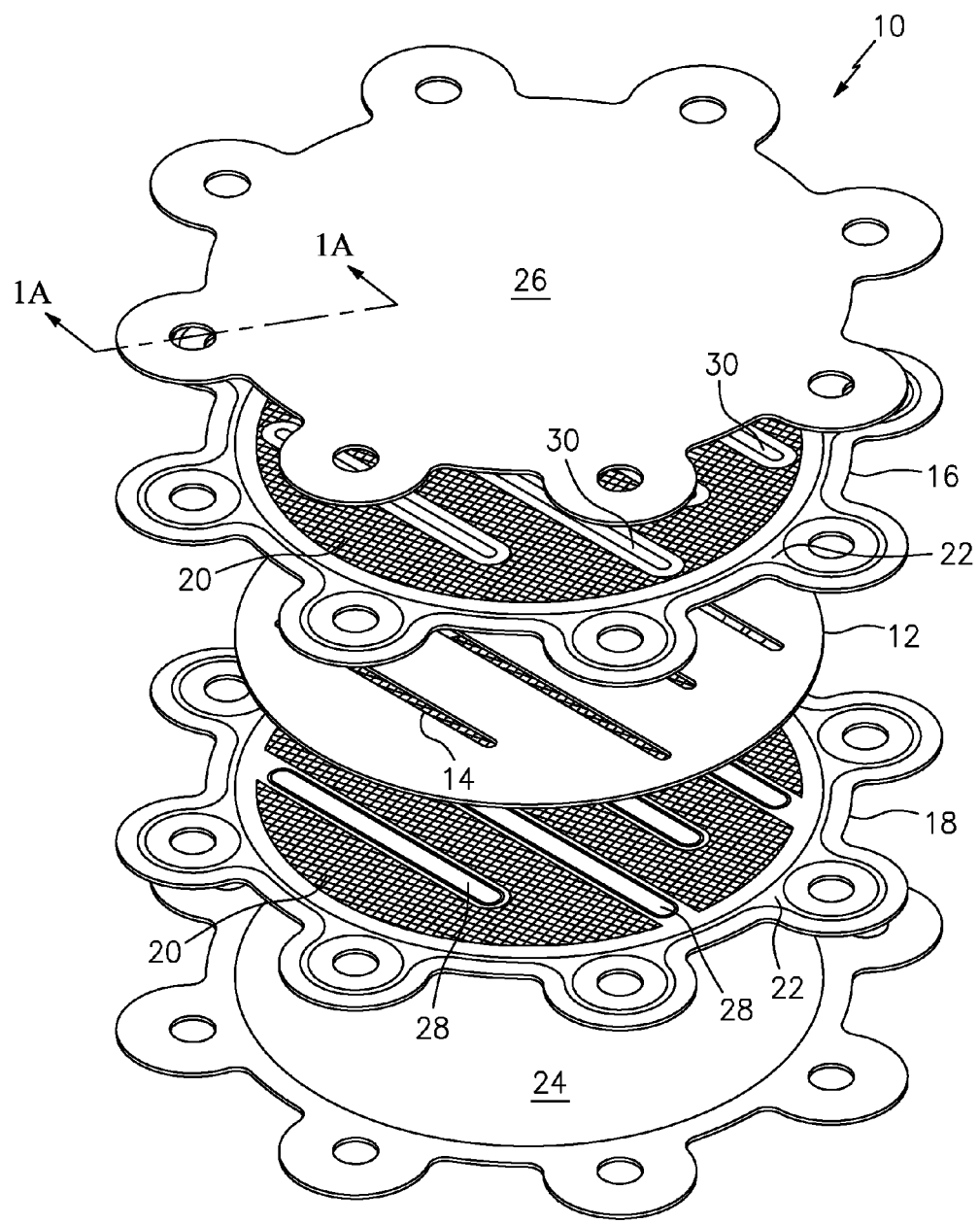
FIG. 1 is an exploded view of an exemplary "active area current collection" embodiment of the fuel cell of the present invention showing a water/gas porous separator with through-holes, the through-holes allowing contact between two mating structures found on a water chamber or flowfield and on an oxygen screen/frame assembly.

Referring now to FIG. 1 in detail, reference numeral 10 has been used to generally designate one embodiment of the fuel cell or fuel cell stack of the present invention, while reference numeral 12 has been used to generally designate one embodiment of the water/gas porous separator. The porous separator 12 is shown with a series of parallel, elongate, oval-shaped through-holes 14. A water chamber or flowfield 16 (with a mating structure) is located on one side of separator 12, while an oxygen screen/frame assembly 18 (with a complimentary mating structure) is located on an opposing side, thereby forming a so-called water transport assembly. Generally speaking, the water chamber or flowfield 16 and the oxygen screen/frame assembly 18 both include a central portion 20 having a multitude of fluid-flow spaces and a frame portion 22 integral with and circumferentially surrounding the central portion 20. The diameter of porous separator 12 is slightly larger than the diameter of the central portions 20 of the water chamber or flowfield 16 and the oxygen screen/frame assembly 18. An MEA 24 is shown on an opposing side of the oxygen screen/frame assembly 18, while a solid separator sheet 26 is shown on an opposing side of the water chamber or flowfield 16.

Figure 1A:
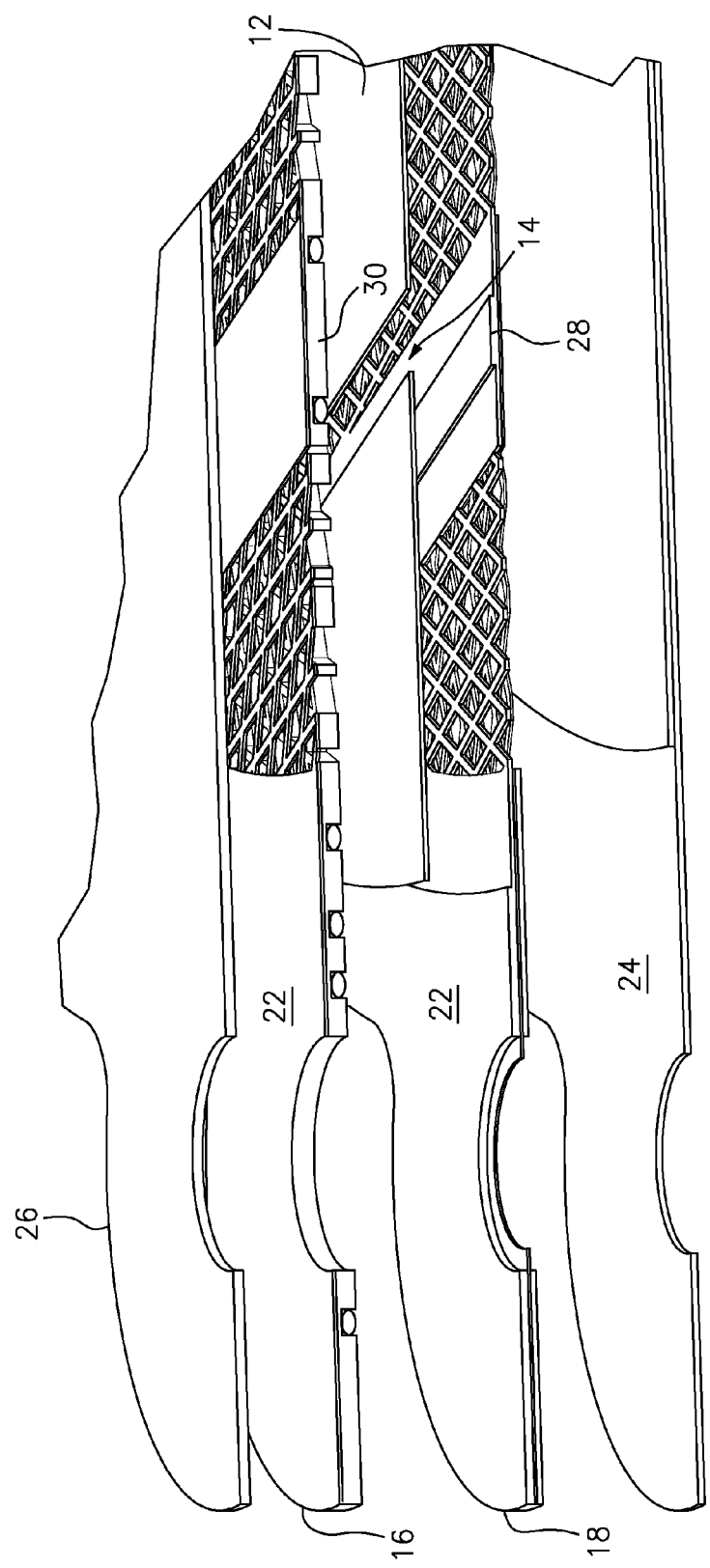
FIG. 1A is a section view of the fuel cell of FIG. 1 taken along lines 1A.

The oxygen screen/frame assembly 18 shown in FIG. 1, which is preferably a diffusion bonded laminar assembly, has a series of bonded (e.g., diffusion bonded) conductive tongue extensions 28 along an upper surface that mate with a series of conductive strips 30 bonded (e.g., diffusion bonded) onto a lower surface of the central portion 20 of the water chamber or flowfield 16. As best shown in FIG. 1A, upon assembly of the inventive fuel cell or fuel cell stack, these mating structures 28, 30 will physically contact each other through the through-holes 14 provided in the porous separator 12, thereby forming an electrical pathway between the conductive oxygen screen/frame assembly 18 and the conductive water chamber or flowfield 16. In this embodiment, current flows through the active area of the cell.

An insulating sealing gasket 32 (e.g., a TEFLON® gasket) (not shown) is positioned between the frame portion 22 of the oxygen screen/frame assembly 18 and the frame portion 22 of the water chamber or flowfield 16 to insure a uniform fit and seal between these components.

Figure 2:
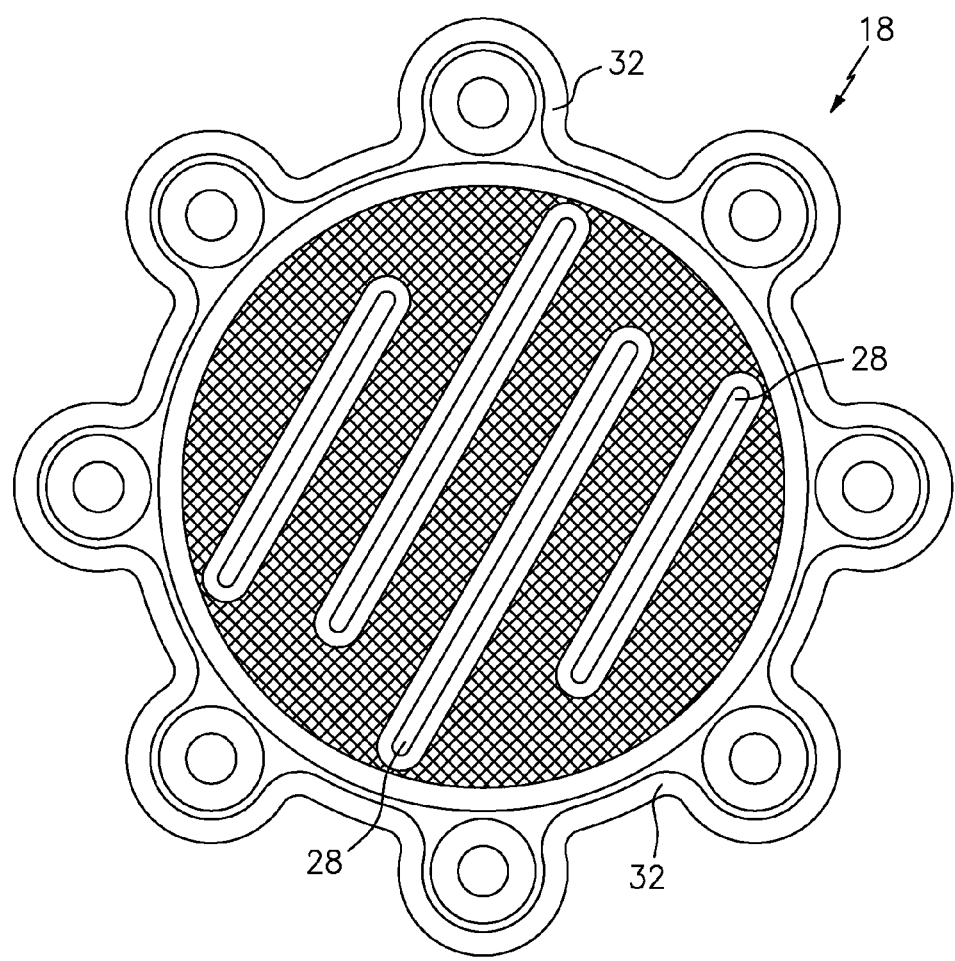
FIG. 2 is a top planar view of the oxygen screen/frame assembly shown in FIG. 1.

A top planar view of the oxygen screen/frame assembly 18 is shown in FIG. 2. Here, the insulating sealing gasket 32 is shown extending around the perimeter of assembly 18.

A two-cell 50 cm$^2$ "bipolar current collection" hybrid test stack was prepared in accordance with the teachings of the present invention and tested. One cell in the test stack utilized gold conductive tongue extensions 28 while the other cell utilized carbon conductive tongue extensions 28. The MEA 24 for each cell employed a NAFION 117 PFSA membrane. A humidifier-degasser cell (H/D cell) was installed, but the degasser was disabled to allow bubble detection. Stack test conditions were as follows: temperature=70° C.; $O_2$ pressure=0.21 MPa; $H_2$ pressure=0.21 MPa; $H_2O$ pressure=0 MPa (approximately 0.21 MPa $O_2$ to $H_2O$ differential). The "bipolar current collection" hybrid test stack successfully performed as follows:

| I (mA/cm$^2$) | Cell 1 Voltage | Cell 2 Voltage |
| --- | --- | --- |
| 0 | 0.988 | 1.007 |
| 104 | 0.854 | 0.867 |
| 208 | 0.820 | 0.829 |
| 312 | 0.791 | 0.797 |
| 417 | 0.768 | 0.771 |
| 500 | 0.746 | 0.748 |
| 604 | 0.723 | 0.724 |
| 708 | 0.701 | 0.700 |
| 812 | 0.683 | 0.678 |

Figure 3:
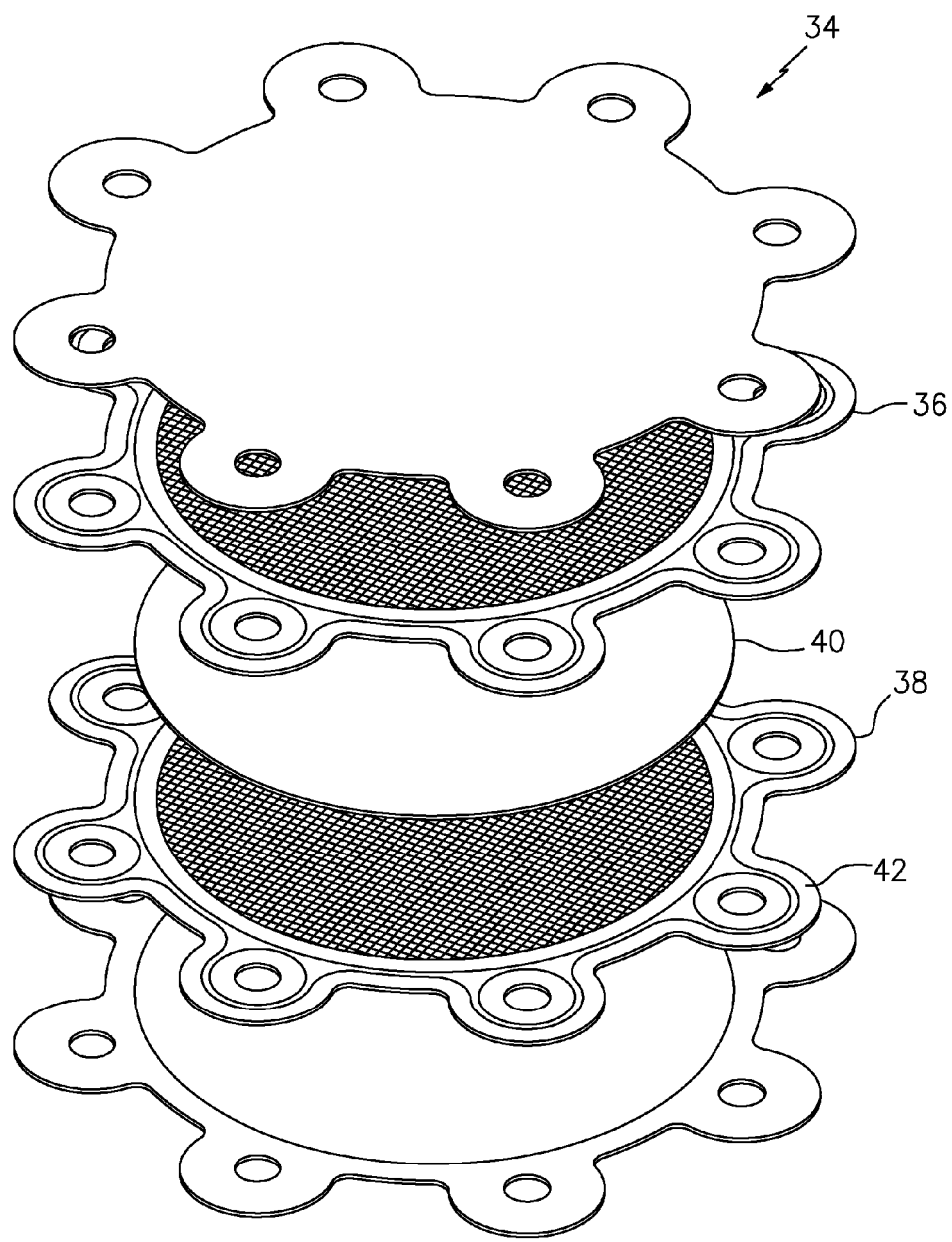
FIG. 3 is an exploded view of an exemplary "edge current collection" embodiment of the fuel cell of the present invention showing a conductive gasket or seal on the perimeter of the oxygen screen/frame assembly.

Instead of current flowing through the active area of the cell, current may also flow around the perimeter of the cell. Referring now to FIG. 3, reference numeral 34 has been used to generally designate a second preferred embodiment of the inventive fuel cell or fuel cell stack. Here, the conductive tongue and groove structure used with the water chamber or flowfield 36 and the oxygen screen/frame assembly 38 and the through-holes used with the porous separator 40 have been eliminated and current is now passed by way of a conductive sealing gasket 42 located on the perimeter of the cell. This conductive sealing gasket 42, which replaces the non-conductive insulating gasket used in the first preferred embodiment, electrically connects the water chamber or flowfield 36 and the oxygen screen/frame assembly 38. As will be readily appreciated by those skilled in the art, this embodiment simplifies manufacture by combining the sealing and conductivity functions into one component. As in the first preferred embodiment, the diameter of porous separator 40 in this embodiment is slightly larger than the diameter of the central portions of the water chamber or flowfield 36 and the oxygen screen/frame assembly 38.

Figure 4:
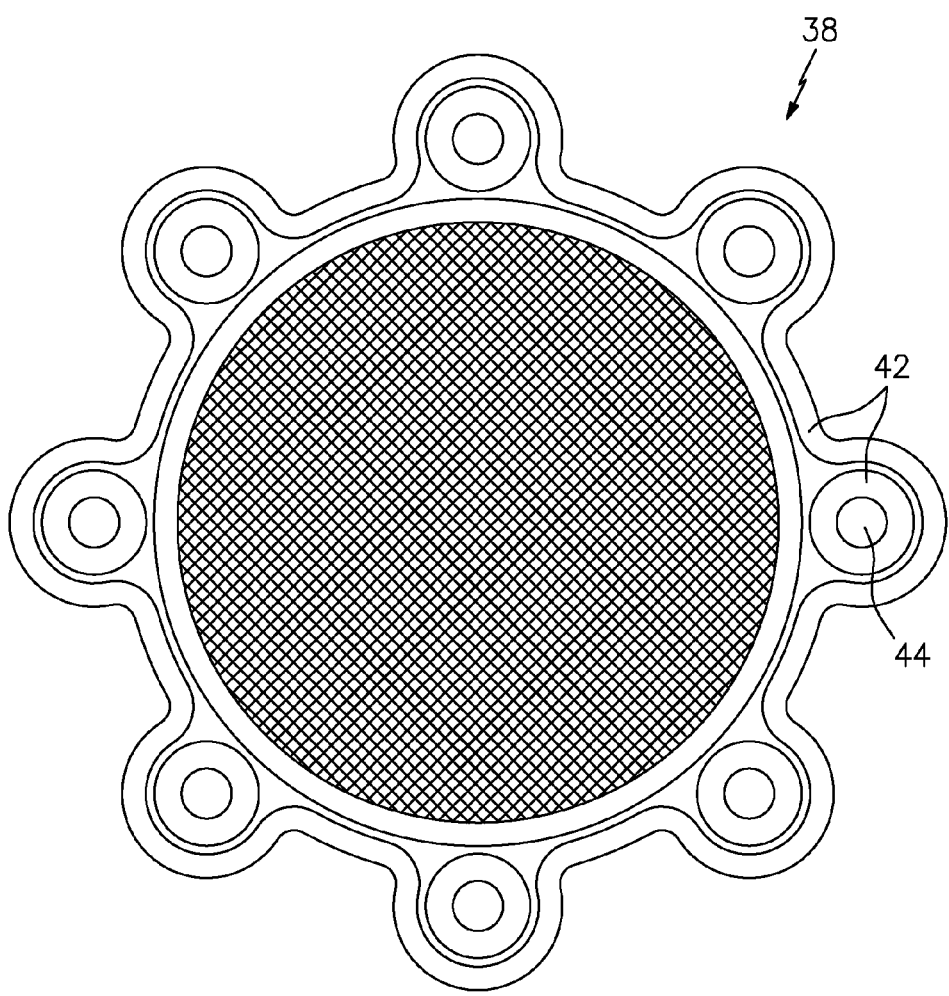
FIG. 4 is a top planar view of the oxygen screen/frame assembly shown in FIG. 3.

As best shown in FIG. 4, which is a top planar view of the oxygen screen/frame assembly 38, conductive sealing gasket 42 extends around the perimeter of assembly 38 and optionally also around fluid ports 44.

Two two-cell 50 cm$^2$ "edge current conduction" test stacks were also prepared in accordance with the teachings of the present invention and tested. In the first test stack, both cells utilized a full PES disk and 0.13 mm GRAFOIL GTA conductive sealing gasket 42 located on the perimeter of the cell, while in the second test stack, both cells utilized two full PES disks and a 0.25 mm GRAFOIL GTA conductive sealing gasket 42. The MEA 24 for each cell employed a NAFION 117 membrane. An H/D cell was installed, but the degasser was disabled to allow bubble detection. Stack test conditions were as follows: temperature=70; $O_2$ pressure=0.21 MPa; $H_2$ pressure=0.21 MPa; $H_2O$ pressure=0 MPa (approximately 0.21 and 0.31 MPa $O_2$ to $H_2O$ differential). The "edge current conduction" test stacks successfully performed as follows:

| I (mA/cm$^2$) | E_Cathode (V) |
|---|---|
| 0 | 1.018 |
| 103 | 0.862 |
| 205 | 0.812 |
| 308 | 0.768 |
| 411 | 0.729 |
| 513 | 0.693 |
| 616 | 0.661 |
| 719 | 0.632 |
| 801 | 0.610 |
| 903 | 0.577 |
| 1027 | 0.545 |

While various embodiments of the present invention have been described above, it should be understood that they have been presented by way of example only, and not limitation. Thus, the breadth and scope of the present invention should not be limited by any of the exemplary embodiments. For example, the same approach as described above may be taken for electrochemical cells in the electrolysis mode with hydrophobic membranes being used instead of hydrophilic membranes. That is, by using a hydrophobic membrane that allows gas to flow but stops water, one can introduce water to the cell, generate gas, and then have the gas leave the cell across the membrane.

What is claimed is:

1. An electrochemical cell providing a high level of in-cell electrical conductivity that comprises a water and gas porous separator prepared from a polymeric material, and one or more conductive cell components within the electrochemical cell that either pass through the water and gas porous separator, or are located within the cell in close proximity to the water and gas porous separator, wherein the water and gas porous separator contains a number of through-holes, and the one or more conductive cell components pass through the through-holes of the water and gas porous separator, wherein a conductive water chamber or flowfield with a mating structure is located on one side of the water and gas porous separator and a conductive oxygen screen and frame assembly with a complimentary mating structure is located on an opposing side of the water and gas porous separator, wherein these mating structures physically contact each other through the through-holes provided in the water and gas porous separator thereby forming an electrical pathway between the conductive water chamber or flowfield and the conductive oxygen screen and frame assembly, or wherein the one or more conductive cell components are located in close proximity to the water and gas porous separator, and wherein the one or more conductive cell components comprise a conductive sealing gasket located on a perimeter of the cell, whereby the conductive sealing gasket electrically connects a conductive water chamber or flowfield and a conductive oxygen screen and frame assembly located on opposing sides of the water and gas porous separator.

2. The electrochemical cell of claim 1, which operates as an in-cell static water removal fuel cell, wherein the water and gas porous separator is prepared from a high bubble point polymeric material.

3. The electrochemical cell of claim 2, wherein the water and gas orous separator is a hydrophilic membrane.

4. The electrochemical cell of claim 3, wherein the hydrophilic membrane is a polyethersulfone membrane.

5. The electrochemical cell of claim 2, wherein the water and gas porous separator has a bubble point of greater than 0.06 MPa.

6. The electrochemical cell of claim 5, wherein the water and gas porous separator has a bubble point of from about 0.07 to about 0.55 MPa.

7. The electrochemical cell of claim 2, which demonstrates an area specific resistance measured by ASTM B193-02 (2008) of less than or equal to about 100 mohm-cm$^2$.

8. The elect chemical cell of claim 7, which demonstrates an area specific resistance measured by ASTM B193-02 (2008) of less than about 20 mohm-cm$^2$.

9. The electrochemical cell of claim 1, which operates as an in-cell static gas removal electrolysis cell.

10. The electrochemical cell of claim 9, wherein the water and gas porous separator is a hydrophobic membrane.

11. The electrochemical cell of claim 1, wherein the oxygen screen and frame assembly has a series of bonded conductive tongue extensions along an upper surface that mate with a series of conductive strips bonded onto a lower surface of a central portion of the water chamber or flowfield.

12. An electrochemical cell providing a high level of in-cell electrical conductivity that comprises a water and gas porous separator prepared from a polymeric material, and one or more conductive cell components within the electrochemical cell that pass through the water and gas porous separator, wherein the water and gas porous separator contains a number of through-holes, and the one or more conductive cell components pass through the through-holes of the water and gas porous separator, wherein a conductive water chamber or flowfield with a mating structure is located on one side of the water and gas porous separator and a conductive oxygen screen and frame assembly with a complimentary mating structure is located on an opposing side of the water and gas porous separator, wherein these mating structures physically contact each other through the through-holes provided in the water and gas porous separator thereby forming an electrical pathway between the conductive water chamber or flowfield and the conductive oxygen screen and frame assembly.

13. The electrochemical cell of claim 12, wherein the oxygen screen and frame assembly has a series of bonded conductive tongue extensions along an upper surface that mate with a series of conductive strips bonded onto a lower surface of a central portion of the water chamber or flowfield.

14. An electrochemical cell providing a high level of in-cell electrical conductivity that comprises a water and gas porous separator prepared from a polymeric material, and one or more conductive cell components within the electrochemical cell that are located in close proximity to the water and gas porous separator, wherein the one or more conductive cell components comprise a conductive sealing gasket located on a perimeter of the cell, whereby the conductive sealing gasket electrically connects a conductive water chamber or flowfield and a conductive oxygen screen and frame assembly located on opposing sides of the water and gas porous separator.

15. An electrochemical cell providing a high level of in-cell electrical conductivity that comprises a water and gas porous separator prepared from a polymeric material, and one or more conductive cell components within the electrochemical cell that pass through the water and gas porous separator, wherein the water and gas porous separator contains a number of through-holes, and the one or more conductive cell components pass through the through-holes of the water and gas porous separator, wherein a water chamber or flowfield with a mating structure is located on one side of the water and gas porous separator and an oxygen screen and frame assembly with a complimentary mating structure is located on an opposing side of the water and gas porous separator, wherein the water chamber or flowfield, the water and gas porous separator and the oxygen screen and frame assembly together form a water transport assembly, and wherein the oxygen screen and frame assembly has a series of bonded conductive tongue extensions along an upper surface that mate with a series of conductive strips bonded onto a lower surface of a central portion of the water chamber or flowfield.

16. An electrochemical cell providing a high level of in-cell electrical conductivity that comprises a water and gas porous separator prepared from a polymeric material, and one or more conductive cell components within the electrochemical cell that are located in close proximity to the water and gas porous separator, wherein the one or more conductive cell components comprise a conductive sealing gasket located on a perimeter of the cell, and wherein a water chamber or flowfield is located on one side of the water and gas porous separator and an oxygen screen and frame assembly is located on an opposing side of the water and gas porous separator, wherein the conductive sealing gasket electrically connects the water chamber or flowfield and the oxygen screen and frame assembly.

17. An electrochemical cell providing a high level of in-cell electrical conductivity that comprises a liquid and gas porous separator prepared from a polymeric material, and one or more conductive cell components within the electrochemical cell that either pass through the liquid and gas porous separator, or are located within the cell in close proximity to the liquid and gas porous separator, wherein the liquid and gas porous separator contains a number of through-holes, and the one or more conductive cell components pass through the through-holes of the liquid and gas porous separator, wherein a conductive liquid chamber or flowfield with a mating structure is located on one side of the liquid and gas porous separator and a conductive gas chamber or flowfield with a complimentary mating structure is located on an opposing side of the liquid and gas porous separator, wherein these mating structures physically contact each other through the through-holes provided in the liquid and gas porous separator thereby forming an electrical pathway between the conductive liquid chamber or flowfield and the conductive gas chamber or flowfield, or wherein the one or more conductive cell components are located in close proximity to the liquid and gas porous separator, and wherein the one or more conductive cell components comprise a conductive gasket located on a perimeter of the cell, whereby the conductive gasket electrically connects a conductive liquid chamber or flowfield and a conductive gas chamber or flowfield located on opposing sides of the liquid and gas porous separator.

* * * * *